April 20, 1926.
J. C. LINCOLN
MOLD FOR CAST WELDING RAIL BONDS
Original Filed May 20, 1916
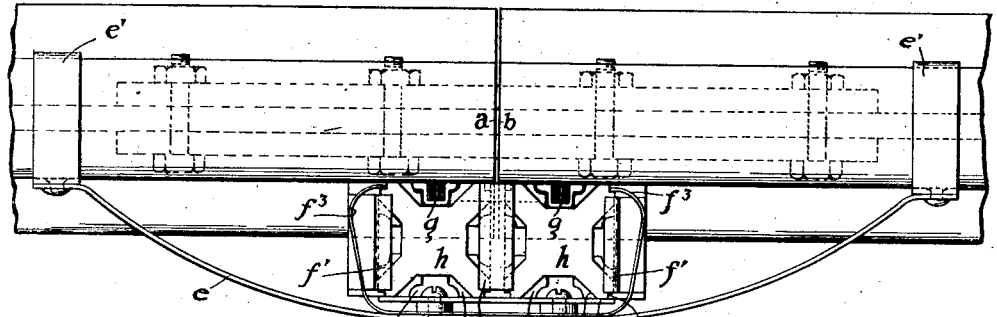
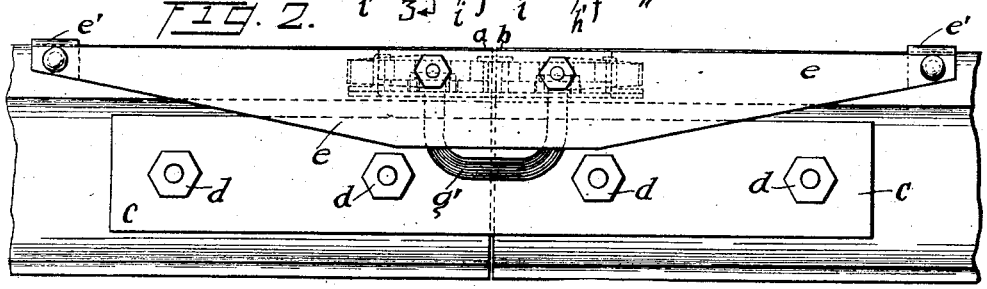
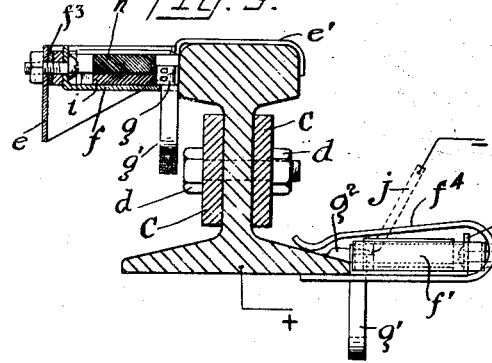
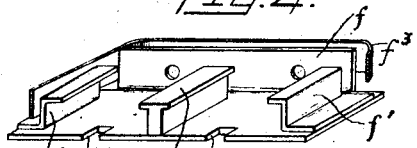
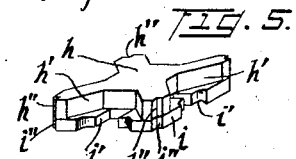
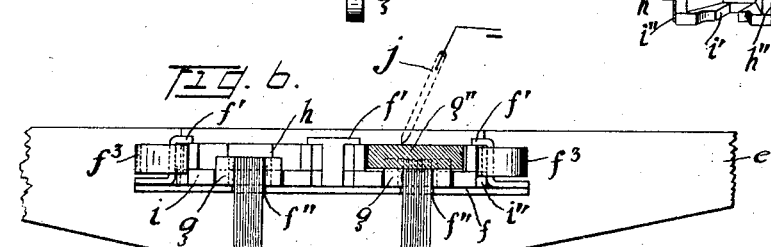
WITNESSES:
INVENTOR,
JOHN C. LINCOLN,
BY
ATTORNEY.

Patented Apr. 20, 1926.

1,581,455

UNITED STATES PATENT OFFICE.

JOHN C. LINCOLN, OF CLEVELAND, OHIO, ASSIGNOR, BY MESNE ASSIGNMENTS, TO THE UNION TRUST COMPANY, OF CLEVELAND, OHIO, A CORPORATION OF OHIO.

MOLD FOR CAST-WELDING RAIL BONDS.

Application filed May 20, 1916, Serial No. 98,827. Renewed November 6, 1925.

*To all whom it may concern:*

Be it known that I, JOHN C. LINCOLN, a citizen of the United States, residing at Cleveland, in the county of Cuyahoga and State of Ohio, have invented certain new and useful Improvements in Molds for Cast-Welding Rail Bonds, of which the following is a specification.

My invention relates to improvements in molds for cast-welding rail bonds, and has for its object the provision of means for readily cast-welding electric bonds upon the ends of railway rails as laid in position for use.

In U. S. Letters Patent No. 1,183,992, granted to me May 23, 1916, I have set forth a method and certain means for cast-welding rail bonds, and my present invention is an adjunct thereto, whereby the electric bonds are fused or welded directly to the bodies of adjacent rail ends. The means therein shown have been improved upon and are herein claimed in such improved form.

Primarily, the process of cast-welding rail bonds comprises the positioning of the copper bond with its terminals in engagement with the adjacent rail ends and surrounded by a carbon or carbon-faced mold upon three sides, wherein the terminals of the bond may be fused by an intensive heating flame directly with the bodies of metal of the respective rail ends. Additional metal, such as copper, is preferably fused with the terminals or heads of the bond and the metal of the respective rail ends to afford adequate conductivity at these points.

In practicing this invention, it is desirable that the apparatus may be readily attached to and detached from the rail ends, while the carbon molds, being subject to some deterioration by reason of the intense heat applied thereto, should accordingly be readily renewable.

My present invention contemplates a mold which is adapted to be readily positioned adjacent to the rail ends and comprises a holder for renewable carbon blocks of suitable form; the said blocks preferably being each constructed of two co-acting sections adapted to be turned individually into position for forming a receptacle for a terminal of the bond and a recess for concentrating the heat and for cast-welding additional copper with the bond terminal and rail end.

My invention will be more readily explained by making reference to the accompanying drawings, wherein:

Figure 1 is a plan view of two rail ends with my improved mold positioned for use thereon.

Figure 2 is a view thereof in side elevation.

Figure 3 is a cross sectional view on line 3—3, Figure 1, together with a slightly modified type mold in side elevation attached to the base flange of the rail.

Figure 4 shows in perspective the metal holder for receiving the carbon blocks.

Figure 5 shows in perspective a carbon block comprising two sections assembled for insertion in said holder.

Figure 6 illustrates in side elevation, upon an enlarged scale, a bond with its terminals positioned within the carbon-faced mold, one of said terminals having been cast-welded to a rail, the cast-welded bond head metal being shown in section.

Throughout the several figures of the drawings I have employed the same character of references to indicate similar parts.

The rail ends, $a$, $b$, which are to be bonded, are understood to be in position for use and united by fish-plates $c$ and bolts $d$. More often, the bond is attached to the heads of said rails and the apparatus of Figures 1 and 2 is especially designed therefor. This comprises a bowed spring $e$ having suitable terminals $e'$ adapted to be clamped over the respective rail ends. Midway thereof there is provided a metal frame $f$, such as shown in Figure 4, which is provided with slides $f'$ adapted to receive the carbon mold sections and the bottom plate of which is notched or slotted at $f''$ to accommodate the clips $g$ surrounding the terminals of the bond $g'$. The preferred type of bond is well shown in Figures 1 and 6, comprising copper laminæ whose terminals are secured by three-sided clips $g$; and the particular carbon blocks or mold sections hereinafter set forth, are shaped to accommodate these clips and bond terminals, although it will be understood that the structure thereof may be varied as desired, to accommodate any other type of clip and/or terminal. These carbon blocks $h$, $i$, are symmetrical; presenting recesses $h'$, and slots or recesses $i'$, upon the four sides thereof which accommodate the clips $g$ and the enclosed terminals of the bond and which afford an enlarged space, wherein the heating effect of an intensive flame or an electric arc may be concentrated upon the adjacent portion of the rail end and upon the inserted portion of the bond terminal to form a cast-welded bond head. A spring $f^3$ is adapted to engage corner notches $h''$, $i''$ afforded respectively in said carbon blocks, whereby they are removably maintained in position within the frame.

The bond $g'$ is inserted with each terminal and with each clip $g$ partially protruding above the surfaces respectively of the lowermost blocks $i$, as is well shown in Figures 1, 3 and 6; in which position an intensive flame, such as the negative terminal of the electric arc may be applied to the contained portion of the clip and bond terminal, and to the adjacent surface of the rail end; the heat thereof being concentrated within the recess $h'$ of said mold so that the bodies of metal are fused or cast-welded into a unitary electrical conductor, after which, if desired, additional metal, as from a rod of copper, may be subjected to the action of the arc and fused to the rail ends and each bond terminal to afford additional conductive heads $g''$ for the bond, as described in said Letters Patent above referred to.

The form of mold shown at the right in Figure 3 is similar to the one just described, except that a suitable bowed enclosing spring $f^4$ is adapted to clamp the mold upon the base flange of the rail in which position the additional body of copper $g^2$ is made to spread or fuse laterally upon the upper face of the base flange, as shown.

From the foregoing it will be seen that my improved apparatus preferably comprises a frame removably attachable to a suitable portion of the rail, wherein a carbon mold or molds may be removably inserted, thus affording a carbon-faced mold wherein to cast-weld the bond terminals to the rails. These carbon mold sections or blocks preferably are shaped to supplement one another, inasmuch as they are subject to destructive action of the electrical arc or other heating flame.

The lower of said mold sections accommodates and protects the enclosed portion of the bond terminal, while the upper mold section serves to concentrate the heating effect of the arc and afford a cavity or recess wherein the copper may be fused. When symmetrically constructed, it is apparent that the mold sections may individually be turned for use upon four sides so that the life of said members is materially lengthened, and they are readily inserted in and removed from the co-acting frame or slide.

While I have described the use of carbon mold sections because they are preferable, by reason of the fact that a better union is effected between the copper bonds and steel rail ends, my invention is not necessarily restricted to this material inasmuch as a suitable refractory material of negligible thermal conductivity, such as a high grade of fire brick for example, might be used for the renewable mold sections under some circumstances.

Having now described the preferred embodiment of my invention, I claim as new and desire to secure by Letters Patent the following:—

1. A removable mold for cast-welding rail bonds, comprising a block having a plurality of carbon-faced recesses adapted to receive the terminals of an electric bond; each recess being formed to embrace the bond terminals upon three sides and position them adjacent to the rail ends respectively, and means for removably clamping the block and bond in position for cast-welding the bond terminals upon the rail ends, substantially as set forth.

2. A removable mold for cast-welding rail bonds, comprising renewable members having carbon-faced recesses adapted to receive the terminals of an electric bond; said recesses being formed to embrace the bond terminals upon three sides and position them adjacent to the rail ends while affording an enlarged opening above said terminals wherein additional material may be fused, and means for removably clamping the mold and bond in position for cast-welding the bond terminals upon the rail ends, substantially as set forth.

3. A removable mold for cast-welding rail bonds, comprising a recessed non-combustible frame, a plurality of mold sections adapted to be inserted therein and embrace the bond terminals respectively upon three sides, and means for removably securing the mold and bond in position for cast-welding the bond terminals to the rail ends, substantially as set forth.

4. In a mold for cast-welding electric bonds upon rail ends, the combination with a metallic frame, of a plurality of recessed carbon blocks adapted to be inserted within said frame and respectively embrace the bond terminals upon three sides and means for securing the frame and mold sections removably upon the rail ends, substantially as set forth.

5. A mold section, comprising a carbon body having symmetrical recesses upon a plurality of its sides, whereby said section may be turned for use upon different sides, substantially as set forth.

6. A multiple mold for electric bonds, comprising a plurality of relatively non-conductive symmetrical sections formed with co-acting lateral recesses upon a plurality of their sides; the one being formed to fit the terminal of the electric bond and the other being shaped to afford an enlarged cavity adjacent thereto, whereby the bond may be positioned with its terminals engaging the rail ends, substantially as set forth.

7. A support and mold for cast-welding rail bonds, comprising a metallic frame recessed to receive the bond terminals, means for temporarily attaching it to the rail ends, and a renewable carbon mold disposed within the frame, substantially as set forth.

8. A support and mold for cast-welding rail bonds, comprising a recessed metallic frame for accommodating the bond terminals, means for temporarily attaching it to the rails, and a recessed mold member registering approximately with the recesses of the frame but with larger recesses wherein the bond terminals may be cast-welded to the rails, substantially as set forth.

9. A detachable support and mold for cast-welding rail bonds, comprising a recessed metallic base adapted to receive the bond terminals, means for temporarily attaching it to the rail ends, and a recessed renewable carbon-faced mold member held upon said base in position for cast-welding an enlarged terminal connection to the bond and rail end, substantially as set forth.

10. A mold for cast-welding a bond to a rail comprising a frame portion, renewable refractory material disposed within said frame portion to form a portion of the walls of an open top mold cavity, an opening in said frame portion to receive a bond end and to permit said bond end to extend into said mold cavity, said frame portion being adapted to support said bond end in operative position within said mold cavity.

11. A mold for cast-welding a bond to a rail comprising a plurality of renewable refractory members assembled to form a portion of the walls of an open top mold cavity, said refractory members being arranged to receive a bond end and to permit said bond end to extend into said cavity, and means for maintaining said members in assembled relation, said means being adapted to support said bond end in operative position within said mold cavity.

In testimony whereof I affix my signature.

JOHN C. LINCOLN. [L. S.]